United States Patent Office 2,698,828
Patented Jan. 4, 1955

2,698,828

PROCESS OF PRODUCING BAKER'S YEAST FROM PENTOSE CONTAINING COMPOUNDS

Konrad E. Bernhauer, Lorsch (Hessen), and Elisabeth M. Becher, Stockstadt (Main), Germany, assignors to Aschaffenburger Zellstoffwerke A. G., Redenfelden, Germany No Drawing. Application January 5, 1951,
Serial No. 204,701

3 Claims. (Cl. 195—79)

This invention relates to a process of producing baker's yeast from pentose containing compounds.

The prior patent application Serial No. 183,900 relates to a process of producing yeast from substrates containing pentose, for example sulfite waste liquor from beech wood or still residues containing the nonfermentable sugars remaining after alcoholic fermentation of sulfite waste liquor from spruce wood or of wood sugar stillage remaining after alcoholic fermentation of wood hydrolysates by using Saccharomyces cerevisiae for the propagation of yeast.

By producing yeast from pentose containing substrates according to that process yeast was received with an activity in alcoholic fermentation considerably lower than that of the Saccharomyces cerevisiae having strong fermentation activity used as starting material.

It is a characteristic feature of this process that the activity of the "pentose yeast" especially during the first stage of the fermentation in a solution containing hexoses or in the dough is quite sluggish. The fermentation proceeds therefore considerably slower than with the usual baker's yeast, propagated generally in the solution of molasses. But after a lag phase of 1–2 hours the yeast is in full activity and finally approximately the same fermentation values (measured as $CO_2$ or dough volume) are arrived at as in using the normal baker's yeast. A more detailed investigation shows that the diminished fermentation activity is not connected with the fact that the substrate used for the cultivation is poorer in vitamins or growth factors than the molasses generally used for producing baker's yeast for a substrate very similar to sulfite waste liquor of beech wood or spruce sulfite waste still residues, that is sulfite waste liquor of spruce wood, yields a baker's yeast of normal activity, as it is long known as the Heijkenskjöld process, if the preparation of the waste liquor has been performed under certain precautions, see for example "Hägglund" Holzchemie, 2nd edition, 1930, pages 307 and following. It is an object of our invention to remove that fermentation inactivity and to endow to the pentose yeast immediately the normal activity. We attain this effect by our invention by subjecting the pentose yeast to a short readaptation in a medium containing only fermentable sugars. An addition of nutrient salts is not necessary for the hexose containing substrate used for the readaptation. It is not the invention to propagate the pentose yeast in the hexose solution but only to readapt that yeast again to the fermentation of hexoses, that means a readaptation in a medium containing fermentable sugar by a short alcoholic fermentation without the necessity of multiplication of the yeast cells.

The yeast obtained from such a short fermentation for example of 1–2 hours acquired its normal activity. That can be confirmed by tests.

The readaptation of yeasts in itself is a known method to increase the fermentation activity, if that activity has been diminished for any reason, for example by long storing, infections or the like. But this is quite another procedure as compared to what occurs in our invention. Such a treatment called "refermentation" intends, for example, to bud again a yeast stored a long time and partially autolysed and to refresh the yeast in that manner or to kill such infections at lower pH during such a "refermentation" and to remove such infections in that manner. In all those or similar cases, the process started from an old or infected yeast that is a yeast "sick" in any respect. In addition to this that method of "refermentation" is usually based on a growth of cells or on the stimulation of the propagation of the yeast. Therefore this is rather a "repropagation" than a simple "refermentation" in the proper sense.

According to the present invention we start from a quite healthy, freshly cultivated pentose yeast free from infection. In this case the character and the purpose of the "refermentation" are quite different. In the process of our invention we obtain a quickly proceeding adaptation of the yeast enzymes to the fermentation of the hexoses. It could not be expected that by such a "refermentation" in a medium completely free of nutrient salts and vitamins, containing only fermentable sugar, a pentose yeast with normal fermentation activity could be obtained. The discovery of our invention based on and proved by that the slowly fermenting pentose yeast attains a normal activity by readaptation in hexose containing substrates and can only then be used as baker's yeast, is therefore quite new and useful. Our experiments have shown that the conditions to obtain that readaptation effect may change within a wide range, as the only object of those conditions is to provide a short alcoholic fermentation.

Thus, for instance the concentration of the sugar solution may vary within wide limits, for example between 0.5 and 5%. Furthermore, the ratio between the quantities of sugar and yeast may be varied, for example for 1 part of sugar, 10–100 parts of moist yeast. Therefore it will be apparent that numerous modifications and variations may be effected in the practice of our invention.

According to our invention, we use therefore only a minimum of sugar being completely fermented in a short time. Therefore the conditions for the industrial use of our new process can be kept in very favorable and useful terms. A fermentation of a solution of 1% glucose with a suspension of 50% moist yeast within 1–2 hours for example has the desired effect. Instead of glucose may be used any fermentable hexoses or di- or trisaccharides composed of zymo-hexoses. Most of the different technical substrates containing such fermentable sugars, for example molasses or sulfite waste liquor of spruce, may be used too. Especially in using the material last mentioned, the conditions may be adapted with success to the technical conditions existing for example in pulp mills.

A further advantage of our invention is a very useful and desirable extension of the raw material scope for the production of baker's yeast. Hitherto baker's yeast was only produced from substrates containing hexoses, substrates having per se a wide field of technical application. Now it is possible according to our invention, to propagate Saccharomyces in a substrate containing pentose utilizing the process of patent application Ser. No. 183,900 and to readapt the pentose yeast obtained in that process with a small amount of hexose within a short time for obtaining baker's yeast with a normal activity. Advantageously sulfite waste liquor of spruce is used as readaptation substrate. It is also possible to readapt the pentose yeast grown in the propagation medium and not isolated.

*Examples*

(1) 50 parts Saccharomyces cerevisiae obtained by propagation in a pentose containing medium are well stirred in a solution of about 1 per cent technical glucose and fermented 1–2 hours at about 30° C. After the reduction power of the solution has disappeared, the yeast is obtained by centrifuging and washing out in the usual manner. It has the normal activity of baker's yeast.

(2) 100 parts of waste liquor of beech, birch or other leafy wood containing the Saccharomyces cerevisiae propagated in it, were adjusted by centrifugation to a content of 5–10% dry yeast. This mash is well mixed with 50 parts of sulfite waste liquor of spruce wood, prepared for the fermentation in the usual manner, the content of reducing matter being about 1.5%.

After about 2 hours the fermentation is completed. The yeast obtained in the usual manner and purified by washing has the same activity as the usual baker's yeast propagated for example in a solution of molasses.

While the character of this invention has been described in detail and illustrative examples given, this has been done by way of illustration only and with the intention that no limitation should be imposed upon the invention thereby. It will be apparent to those skilled in the art that numerous modifications and variations may be effected in the practice of the invention within the scope of the appended claims. For example the same effect may be attained by a repropagation, that means a process in which the yeast in a hexose-containing medium (containing nutrient salts) is brought to growth, that is to multiplication.

We claim:

1. The process for readapting *Saccharomyces cerevisiae* to a hexose medium after adaptation to a pentose medium, which comprises adding said pentose-adapted yeast to a hexose medium, and subjecting said pentose-adapted yeast to a short alcoholic fermentation without multiplication of the yeast cells, whereby said yeast becomes re-adapted to a hexose medium.

2. The process for re-adapting *Saccharomyces cerevisiae* to a hexose medium after adaptation to a pentose medium, which comprises adding said pentose-adapted yeast to a hexose medium, subjecting said yeast to an alcoholic fermentation without multiplication of the yeast cells until the reducing power of the medium has substantially disappeared whereby said yeast becomes re-adapted to a hexose medium, separating said yeast from said medium, and washing said separated yeast.

3. The process for preparing *Saccharomyces cerevisiae* re-adapted to a glucose medium after initial adaptation to a pentose medium, which comprises adding said pentose-adapted yeast to a solution of glucose, subjecting said yeast to an alcoholic fermentation for about two hours without multiplication of the yeast cells whereby said yeast becomes re-adapted to a glucose medium, separating said yeast from said medium, and washing said separated yeast.

References Cited in the file of this patent

UNITED STATES PATENTS

| Number | Name | Date |
|---|---|---|
| 1,757,568 | Heijkenskjold | May 6, 1930 |
| 1,909,011 | Riley | May 16, 1933 |
| 2,401,819 | Eweson | June 11, 1946 |

OTHER REFERENCES

Campbell, "Food," April 1941, pages 167–168.
Peterson et al., Ind. & Eng. Chem., Jan. 1945, pages 30–35.
Wahl and Henius, Am. Handy Book of the Brewing, Malting and Auxiliary Trades, vol. 2, 1908, page 1170.
Johnson, Jour. Am. Chem. Soc., 70, 2961–3 (1948).